United States Patent [19]

Tew et al.

[11] Patent Number: 4,530,487

[45] Date of Patent: Jul. 23, 1985

[54] DIRECT DRIVE SERVOVALVE AND FUEL CONTROL SYSTEM INCORPORATING SAME

[76] Inventors: Sydney K. Tew, 50338 Baytown Dr., New Baltimore, Mich. 48047; Dan O. Bauer, 277 Kenwood Ct., Grosse Pointe Farms, Mich. 48236

[21] Appl. No.: 590,243

[22] Filed: Mar. 16, 1984

[51] Int. Cl.³ .......... F16K 31/02

[52] U.S. Cl. .......... 251/138; 335/222

[58] Field of Search .......... 251/138, 129, 58; 335/222, 231, 268, 266, 258

[56] References Cited

U.S. PATENT DOCUMENTS

| | | | |
|---|---|---|---|
| 906,331 | 12/1908 | Struble et al. | 251/129 |
| 1,616,130 | 2/1927 | Knox | 251/138 |
| 3,064,682 | 11/1962 | Holzbock | 251/129 |
| 3,143,131 | 8/1964 | Spencer | 251/138 |
| 3,167,094 | 1/1965 | Costelijns | 251/129 |
| 4,076,046 | 2/1978 | Hieronymus et al. | 251/138 |
| 4,310,143 | 1/1982 | Determan | 251/65 |
| 4,373,697 | 2/1982 | Phelps | 251/129 |

FOREIGN PATENT DOCUMENTS

| | | | |
|---|---|---|---|
| 196517 | 6/1965 | Sweden | 251/129 |

*Primary Examiner*—Samuel Scott
*Assistant Examiner*—Noah Kamen

[57] ABSTRACT

A small, light-weight direct drive servovalve includes a force motor with a stationary magnet structure and a moving coil with the moving coil coupled to a valve spool by means of a lever mechanism which is pivotally mounted on a pivot hub and which amplifies the actuating force exerted on the valve spool. The moving coil is suspended from the pivot hub by dual convoluted spring diaphragms and through the lever mechanism imparts a linear, reciprocating movement to the valve spool. A tandem valve spool and sleeve assembly is employed and provides for two separated hydraulic systems in a common housing. A fuel metering system for a gas turbine engine utilizing such a direct drive servovalve is provided.

42 Claims, 6 Drawing Figures

DIRECT DRIVE SERVOVALVE AND FUEL CONTROL SYSTEM INCORPORATING SAME

FIELD OF THE INVENTION

The present invention relates to direct drive servovalves and to fuel control systems using such servovalves, especially fuel metering systems for gas turbine engines where small light-weight servovalves are desirable.

BACKGROUND OF THE INVENTION

The application of direct drive servovalves to aircraft controls, such as aileron actuators, is discussed in an article entitled "Direct-drive Valve Cuts Fly-By-Wire Costs" in *Machine Design*, pp. 94–95, Dec. 9, 1982. Various types of direct drive servovalves are illustrated and include linear solenoid, moving coil, torque motor and rotary magnet types.

There is a need for a small, light-weight direct drive servovalve for these and other applications, such as fuel control systems for aircraft gas turbine engines.

SUMMARY OF THE INVENTION

An object of the present invention is to provide a direct drive servovalve preferably of the moving coil type in which the motion of the coil is substantially linear and operates through a force gain lever mechanism to directly actuate the valve spool.

Another object of the present invention is to provide a direct drive servovalve preferably of the moving coil type in which the motion of the coil operates through a lever mechanism which inverts the coil motion to the valve spool to allow mass balance techniques to be applied.

Another object of the present invention is to provide such a direct drive servo motor as described in either of the preceding paragraphs wherein the generated force by the moving coil and support means therefor is directly and linearly related to coil current, allowing the use of a relatively large coil stroke with a small working magnet gap without linearity degradation.

Another object of the invention is to provide such a servo motor which is smaller in size as a result of the force gain provided by the force gain lever mechanism and other design factors.

Another object of the invention is to provide such a servovalve in which the moving coil is suspended preferably by dual convoluted spring means which provide a dual load path exhibiting predictable linear rate and hysteresis and which aid in dissipation of coil heat. Preferably, dual redundant moving coils are used to provide two autonomous electrical command channels.

Still another object of the invention is to provide such a servovalve in which the displacement to current gain of the force motor can be adjusted by an externally accessible magnetic shunt which in one embodiment shunts a series reluctance element in the flux path and in another configuration shunts a parallel reluctance element.

Still another object of the invention is to provide such a servovalve in which the moving coil force motor magnetic circuit is not driven through a major hysteresis loop, resulting in reduced overall motor hysteresis and thereby providing enhanced servovalve static accuracy.

Still another object of the invention is to provide such a servovalve in which force motor damping is effected primarily by a coil shorted turn, not by the presence or absence of fluid in the force motor cavity.

And, another object of the invention is to provide such a servovalve in which an area balanced tandem valve spool and sleeve assembly is employed to provide separate dual redundant hydraulic systems in a common valve housing.

Still another object of the invention is to provide a fuel control system which includes such a direct drive servovalve to control metering of the fuel.

The invention contemplates a direct drive servovalve having magnet means and coil means supported for movement relative to one another when the coil means is energized. Preferably, the magnet means is stationary while the coil means is movable relative thereto. A lever means is provided for transmitting the relative motion between the magnet means and coil means to the valve spool means to move same preferably in a linear reciprocating manner and for preferably amplifying the force on the valve spool means by having a first lever portion actuated by the relative movement between the magnet means and coil means and a second lever portion actuating the valve spool means with an intermediate lever portion between said first and second portions pivotally supported preferably by pivot hub means.

In a typical working embodiment of the present invention, the direct drive servovalve includes a stationary permanent magnet structure with pole means defining a working gap and a moving coil carried in the working gap for linear reciprocating movement therein by a coil support ring suspended from a central pivot hub by multiple convoluted spring diaphragms. Linear movement of the moving coil is transmitted to the valve spool means and amplified by multiple drive levers each pivotally mounted on the pivot hub. Each drive lever includes an end portion actuated by the moving coil, another end portion actuating the valve spool means and an intermediate portion pivotally mounted on the pivot hub so that the drive levers constitute levers of the first class. As a result, generated force of the moving coil is amplified and transmitted to the valve spool means by the lever action and imparts a linear movement thereto. Preferably, the linear movement or line of action of the moving coil is substantially parallel with the axis of the valve spool means.

The valve spool means is typically in close fit in a valve sleeve means and together these components define multiple independent hydraulic circuits in a common valve housing means. To this end, a tandem valve spool and sleeve means are employed. Typically, the end portions of the spool means are exposed to the same hydraulic system return pressure to assure insensitivity to variations in return pressure and to prevent failure transients upon shut down of one of the independent hydraulic circuits.

The force motor of the direct drive servovalve is typically driven by current commands which may be pulse width modulated by an electronic controller to provide a digital computer compatible command signal. Motor gain is controlled by an externally accessible adjustment which in one embodiment shunts a series reluctance member positioned in the flux path of the stationary magnet means and in another embodiment shunts a parallel flux path while valve hydraulic null is typically adjustable by an externally accessible differential threaded adjustment means which engages the pivot hub for adjustment of the lever pivot position and thereby adjusts the precise setting of the valve spool and sleeve hydraulic null.

The above and other objects of the present invention as well as a description of preferred embodiments thereof will become apparent by reference to the following drawings and detailed description

DESCRIPTION OF PREFERRED EMBODIMENTS

Figure 1:
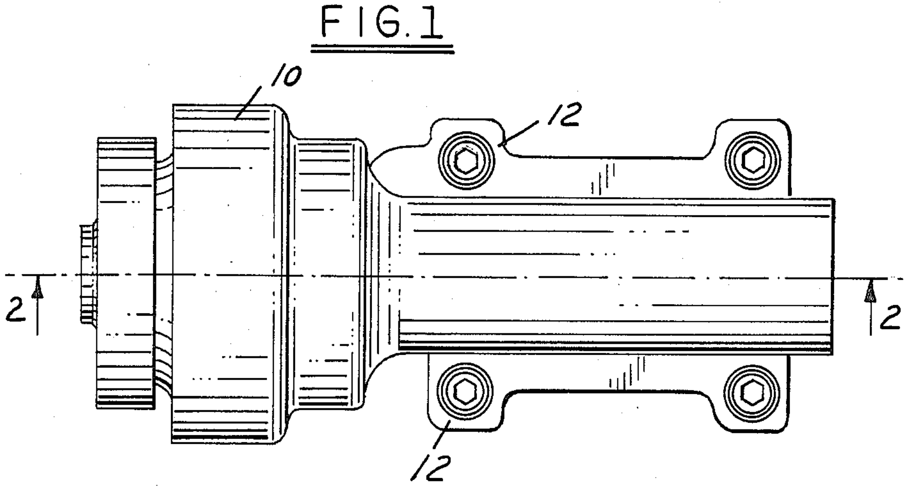
FIG. 1 is a top elevation of a preferred construction of the servovalve of the invention.
Figure 2:
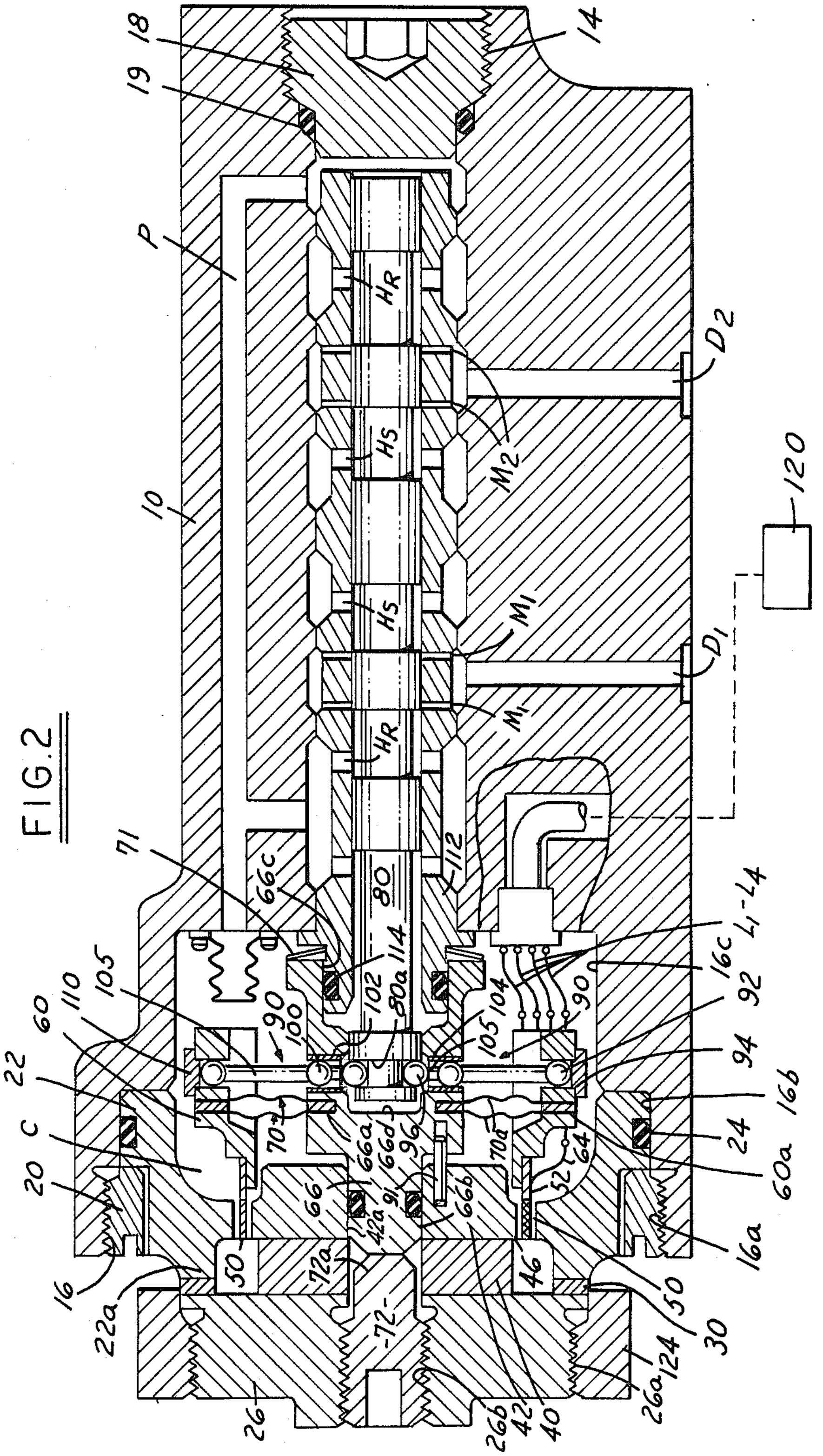
FIG. 2 is a longitudinal cross-sectional view taken along line 2—2 of FIG. 1.

Referring to FIGS. 1 and 2, a preferred construction of the servovalve includes a main housing 10 having laterally extending flanges 12 by which the valve can be mounted. The housing has opposite open threaded ends 14, 16. End 14 is closed by a threaded plug 18 engaged therein and sealed by O-ring 19. The other end 16 includes an outer large diameter threaded internal bore 16*a*, a smaller intermediate bore 16*b* and a still smaller inner bore 16*c*.

An annular externally threaded collar 20 is received in the outer bore 16*a* and retains an annular pole member 22 in the intermediate bore 16*b*. An O-ring 24 provides sealing to prevent fluid escape. A ring member 26 closes off the opening through the annular pole member 22 as shown and is attached thereto via an annular series reluctance member 30 positioned therebetween. Typically, the reluctance member 30 is metallurgically bonded (brazed) to the ring member 26 and to the annular lip 22*a* of the pole member.

A stationary annular rare earth (samarium-cobalt) permanent magnet 40 is secured in the position shown by annular pole member 42 which is attached coaxially to the inner side of the ring 26 by means of screws (not shown), ring member 26 retaining the permanent magnet 40 and pole member 42 in position and constituting part of the flux path between the pole members. As is apparent, the pole members 22, 42 define a working gap 46 therebetween and permanent magnet 40, ring member 26, reluctance member 30 and pole members 22, 42 comprise the permanent magnetic structure of the servovalve.

Received in the gap 46 is a pair of annular coils 50 carried on support tube 52 which in turn is fastened such as by mechanical or other means including brazing, clamping adhesive and the like to the coil support ring 60. Typically, the motor coils are comprised of four wound layers of insulated wire with each coil occupying two layers disposed either side by side or one atop the other.

The coil support ring 60 is suspended from a central pivot hub 66 by two convoluted spring suspension diaphragms 70 each in the form of annular disc-shaped convoluted springs 70*a* with the outer circumference received in grooves 60*a* in the support ring 60 and the inner circumference in grooves 66*a* in the pivot hub 66. A spring 71 biases the pivot hub 66 left in FIG. 2 against the nose 72*a* of a hydraulic null adjustment screw 72 for purposes to be explained herebelow. The two convoluted spring suspension diaphragms provide a dual load path exhibiting a predictable linear spring rate and small hysteresis in the range of 0.1 to 0.2 percent.

Linear movement of the moving coils 50 and coil support ring 60 is transmitted to the valve spool 80 by means of two or more drive levers 90. Each drive lever 90 includes outer ball 92 received in a passage 94 in the support ring 60, inner ball 96 received in a circumferential groove 80*a* in the end of the valve spool 80 and intermediate pivot ball 100 received in a Teflon sleeve 102 in radial passage 104 in the pivot hub 66. The balls 92, 96, 100 are interconnected by high strength rods 105 as by brazing or welding thereto. A retainer cap 110 is attached to the support ring 60 as shown.

The multiple drive levers 90 not only transmit coil movement to the valve spool 80 but also amplify the actuating force exerted on the valve spool. For example, in the arrangement shown, the drive lever mechanism shown has a force gain of two by proper selection of the distances between the balls. For example, the distance between outer ball 92 and intermediate ball 100 is selected to be sufficiently greater than the distance between inner ball 96 and intermediate ball 100 to provide a force gain of two. Thus, with a maximum force on the valve spool of 15 pounds, the maximum force generated by the force motor (moving coil) is 7.5 pounds. Importantly, it is apparent that the drive lever mechanism inverts the coil motion and allows mass balance techniques to be applied to reduce sensitivity to vibration and acceleration in the axial direction. The drive lever mechanism shown maintains linearity of coil movement and valve spool movement as well.

In FIG. 2, the moving coil 50, spring suspension diaphragms 70 and drive levers 90 operate under a "wet" condition, i.e., under hydraulic return pressure. The central pivot ball 100 of the drive levers acts as a low friction bearing arrangement. Heat dissipation from the coils 50 to the housing 10 and to ambient air is aided by providing a thermally conductive coil support ring 60 and the large surface area of the dual spring suspension diaphragms 70 together with the large thermal capacity of the fluid in cavity C. Minimal coil temperatures are thereby maintained. The volume between the convoluted spring suspension diaphragms is vented to the cavity C to prevent development of a differential pressure thereacross.

The pivot hub 66 includes a reduced diameter extension 66*b* extending through central opening 42*a* in the pole member 42 and sealed therein by the O-ring shown. The other end of the pivot hub includes counterbores 66*c* and 66*d*. The valve sleeve 112 is received in counterbore 66*c* and sealed therein by O-ring 114. The valve spool 80 is in close tolerance sliding fit in the sleeve 112 and includes an end with the groove 80*a* therein receiving the inner balls 96 of the drive levers 90 in counterbore 66*c*. A guide pin 91 extends between the reduced diameter extension of the pivot hub 66 and pole member 42.

As shown in FIG. 2, the spool and sleeve assembly is a three-way tandem assembly providing two separate and independent hydraulic circuits $D_1$ and $D_2$ acting through metering orifices $M_1$ and $M_2$ to operate respective control actuators as will be explained herebelow.

The ends of the valve spool 80 are connected to the same hydraulic system return pressure via passages P to assure insensitivity to variations in return pressure and to prevent failure transients upon shut down of either circuit $D_1$ or $D_2$. The use of symmetrical metering orifices $M_1$ and $M_2$ and sleeve supply pressure holes $H_S$ and return pressure holes $H_R$ prevent pressure binding.

The force motor may be driven by current from a conventional pulse width modulated (PWM) current drive device 120 for example via electrical leads $L_1$ through $L_4$ which are flexible and carried on coil support ring 60. Or, the leads $L_1$ through $L_4$ could alternatively be bonded to or deposited on the spring diaphragms 70 and routed through the pivot hub or other components or the spring diaphragms may be segmented to serve as such leads. The generated force applied to the coils 50 and support ring 60 is directly and linearly related to the coil current and allows the use of a relatively large stroke while using a small working gap 46 without linearity degradation. With the drive levers 90 illustrated, the position of the valve spool 80 is directly and linearly related to the coil current as well.

The displacement versus current gain of the force motor can be easily adjusted by the externally accessible motor gain adjustment nut 124 threaded onto the outer threaded surface 26*a* of closure element 26. The effect of rotating the nut 126 is to shunt the series reluctance member 30 located in the flux path, thereby adjusting the location of the operating point on the demagnetization curve.

Motor damping, which is important to achieving the proper valve response versus frequency, is accomplished by a shorted turn coil via lead 64 as will be explained in more detail herebelow, lead 64 being carried on coil support ring 60. Lead 64 could also be plated, bonded or etched onto the coil support tube 52. The fluid in cavity C is a minor factor in effecting motor damping.

Unlike other servovalves, the electric currents in moving coils 50 do not drive the stationary magnetic structure through a major hysteresis loop. This results in reduced force motor hysteresis, providing enhanced servovalve static accuracy performance.

The precise hydraulic null for the servovalve is established by moving the externally accessible adjusting nut 72 threaded into a central threaded bore 26*b* in the ring member 26. Movement of the nut 72 causes variation of the position of the pivot hub 66 against the bias of spring 70 to adjust valve spool position. Once hydraulic null is properly adjusted, the nut 72 is locked in position.

The high pressure gain of the closed center spool valve and the precise hydraulic null, mechanically created at manufacture as just described, substantially prevent adverse effects on the servovalve from variations in supply and return pressure.

As is apparent from the above description, the longitudinal axes of the valve spool 80, permanent magnet 40, pole member 22 and 42, coils 50 and coil support ring 60 are coaxial so that the motion of the coils within the working gap 46 and the line of motive force are substantially parallel to the spool axis.

Figure 4:
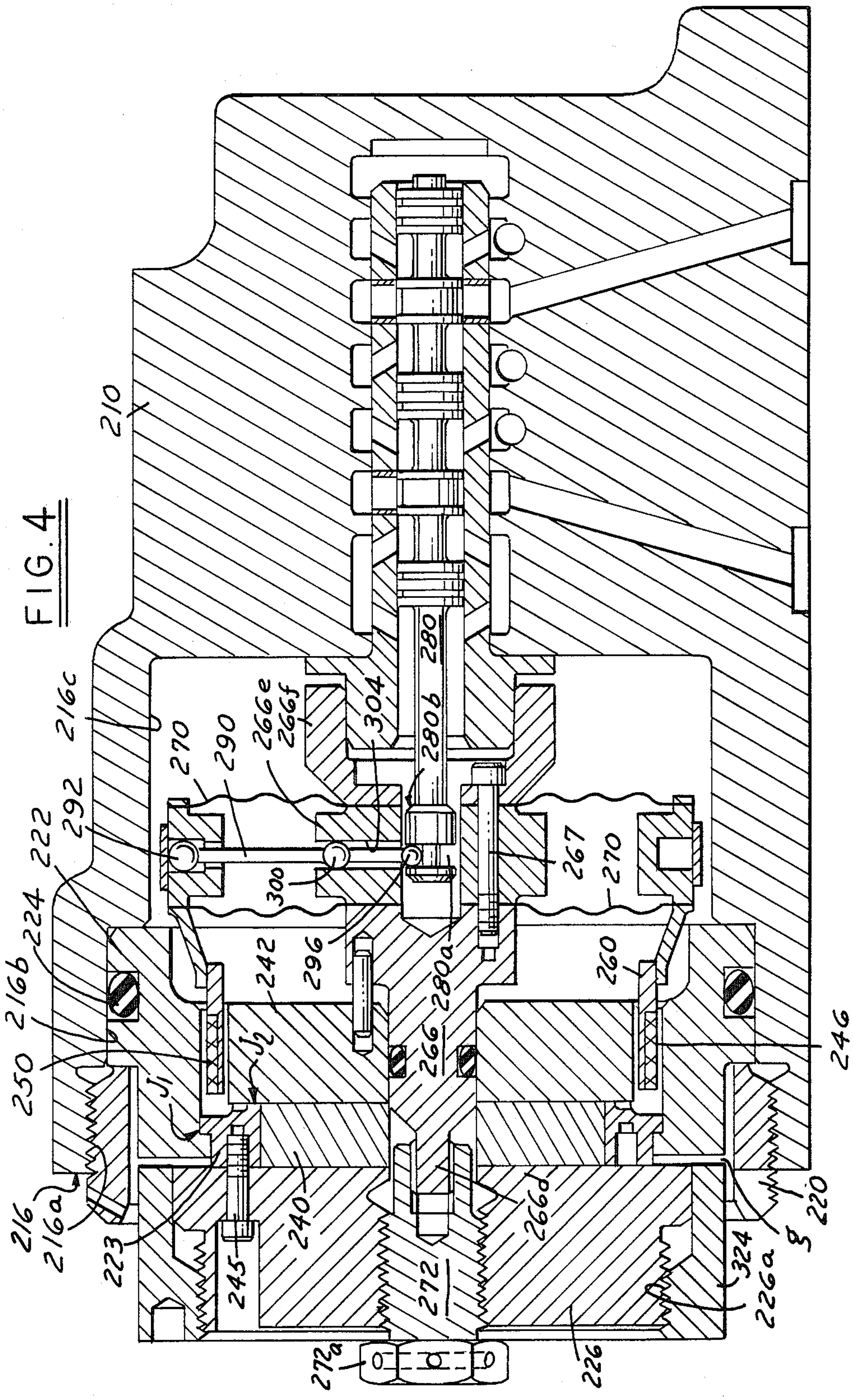
FIG. 4 is a longitudinal cross-sectional view of an even more preferred construction of the servovalve of the invention.

FIG. 4 illustrates an even more preferred embodiment of the servovalve of the invention. The housing 210 has an open end 216 including an outer larger diameter threaded bore 216*a*, a smaller intermediate bore 216*b* and a still smaller inner bore 216*c*. An annular externally threaded collar 220 is threaded in the outer bore 216*a* and retains an annular pole member 222 in the intermediate bore 216*b*. An O-ring 224 provides sealing. The pole member 222 is brazed to an annular, non-magnetic spacer member 223 at their juncture $J_1$ and the spacer member is brazed to the annular pole member 242 at their juncture $J_2$. The annular spacer member 223 surrounds a stationary annular rare earth permanent magnet 240 and the spacer member is attached by multiple screws 245 (only one shown) to ring member 226. As is apparent, the pole members 222 and 242 define a working gap 246 therebetween in which the moving coils 250 carried on coil support tube 260 are disposed for movement as in the previously described embodiment.

Motor gain is easily adjusted by the internally threaded cap 324 threaded onto the outer threaded surface 226*a* of the ring member. By adjusting the cap 324, the air gap g between the lip of the cap and facing surface of pole member 222 can be increased or decreased.

Precise hydraulic null adjustment for the servovalve is effected by moving adjusting knob 272*a* of nut 272 which is threaded into the central threaded hole of the ring member 226. The inner end of the adjustment nut 272 threadingly receives the reduced diameter threaded male end of the pivot hub 266. A differential thread scheme is employed to achieve fine adjustment; e.i., there may be 28 threads/inch on the adjustment nut 272 and 32 threads/inch on the threaded end of the pivot hub 266.

The pivot hub 266 includes the threaded male end 266*d* just described, a central hub portion 266*e* and a female hub portion 266*f* fastened together by multiple machine screws 267 (only one of which is shown). Clamped fixedly between the central hub portion and the male and female hub portions is the inner circumference of a pair of convoluted diaphragm (disc-shaped) springs 270 whereas the outer circumference of each spring 270 is connected to the coil support tube 260. The diaphragm springs 270 have suitable holes therein to receive the screws 267 and a central hole to accommodate the end 280*b* of the valve spool 280.

The coil support ring 260 is connected to the valve spool end 280*b* by drive levers 290 similar to those described hereinabove except that the balls 292, 296 and 300 are of decreasing diameter from the outer ball to the inner ball to facilitate assembly. Outer ball 292 is carried in the coil support ring 260, intermediate ball 300 is pivotally received in radial passage 304 of the central hub portion and inner ball 296 is received in groove 280*a* of the valve spool as described and for the purpose described hereinabove for FIG. 2.

The other components of the servovalve of FIG. 4 correspond generally to those already described with respect to FIG. 2, including the spool and sleeve assembly, and like components are represented by like 200 series reference numerals or primed reference letters.

Figure 6:
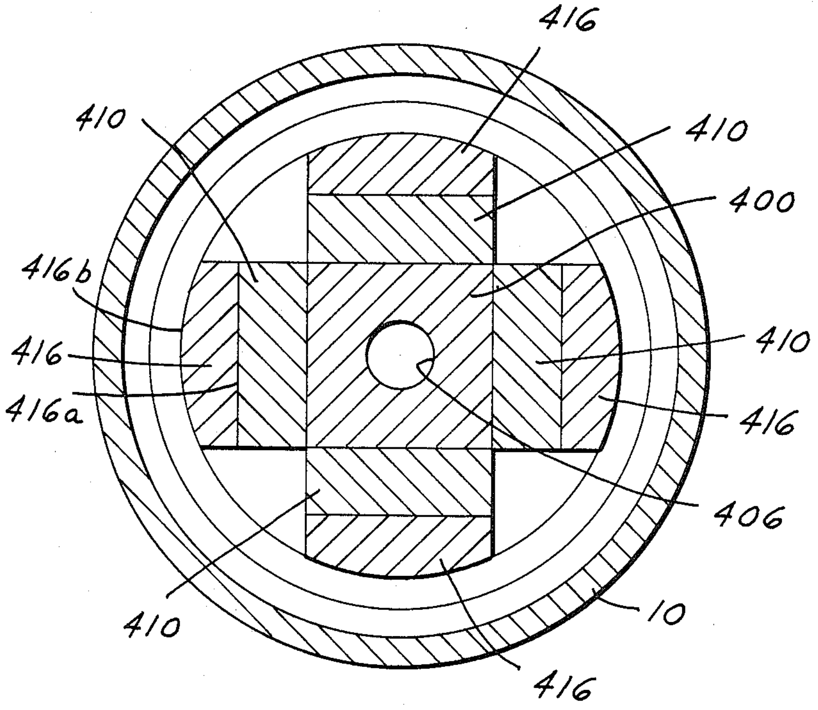
FIG. 6 is a cross-section taken along lines 6—6 of FIG. 5.
Figure 5:
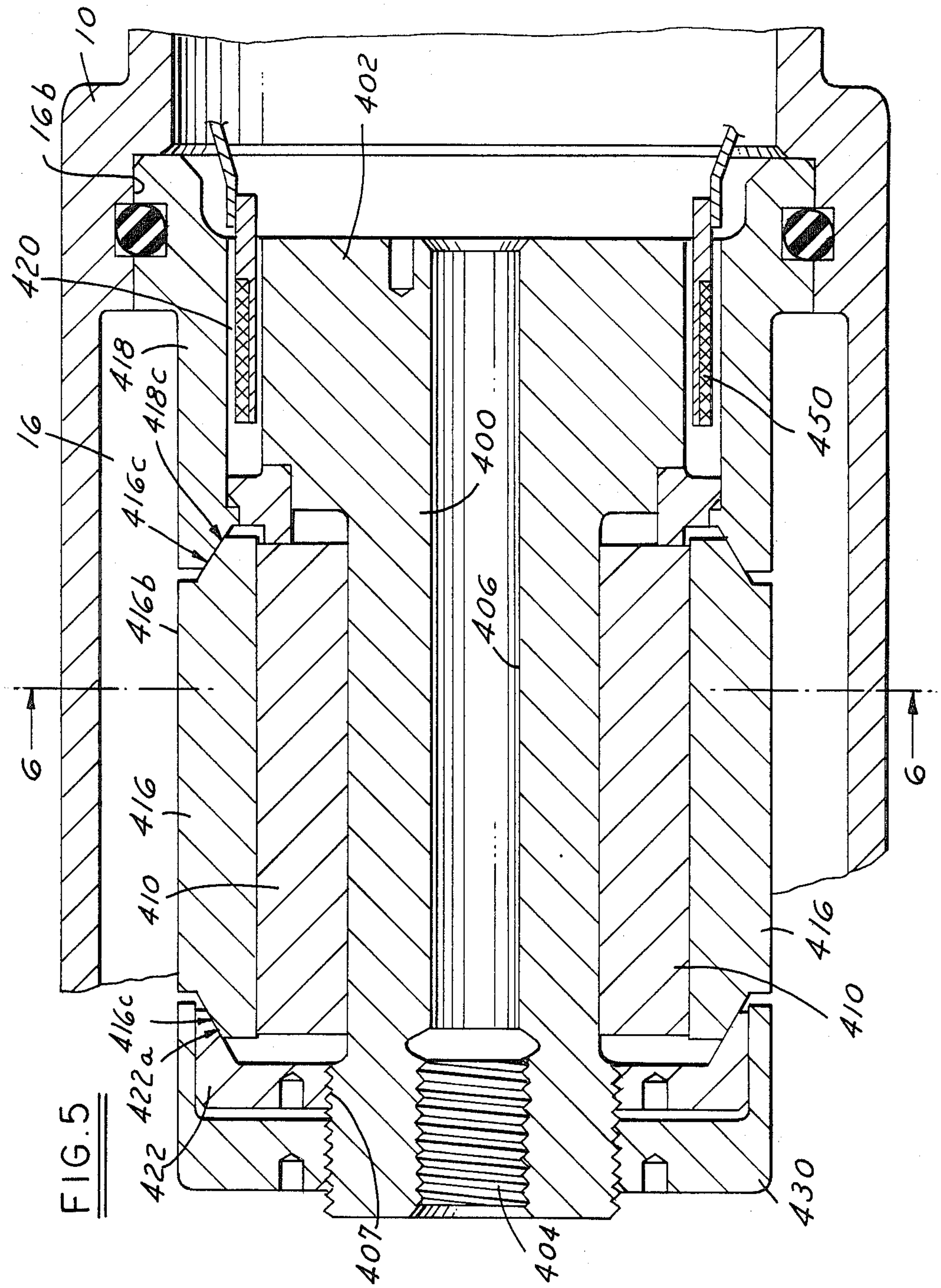
FIG. 5 is a partial cross-sectional view through an alternate permanent magnetic structure for the servovalve.

FIGS. 5 and 6 illustrate another construction for the permanent magnet structure of the servovalve. This structure includes an inner pole member 400 defining an inner pole 402 at one end and being formed with a threaded hole 404 at the opposite connected to central bore 406 therethrough. Threaded hole 404 is adapted to receive an externally threaded hydraulic null adjustment nut (not shown) like those (72, 272) described hereinabove. Bore 406 is adapted to receive the reduced diameter male end (not shown) of the pivot hub corresponding to reduced diameter male ends described hereinabove for FIGS. 2 and 4. As shown in FIG. 6, pole member 400 is square in cross-section and supports rectangular cross-section permanent magnets 410 on each side thereof. The magnets 410 are held against the pole member 400 by four backing members 416 having flat inner surfaces 416a, circular arc outer surfaces 416b and conical cam surfaces 416c therebetween in the cross-section view shown. The right-hand conical cam surfaces 416c in FIG. 5 are mated against complementary conical cam surfaces 418c on outer pole member 418 which is generally cylindrical in shape and spaced from the inner pole member 400 at that end to define a working gap 420 for the moving coils 450. The left-hand conical cam surfaces 416c in FIG. 5 are mated against complementary conical cam surfaces 422a of non-magnetic retainer cap 422 having inner threads 422b threaded onto the external threads 407 of the inner pole member 400. By tightening cap 422, it is seen that the permanent magnets 410 are wedged or cammed against the sides of inner pole member 400. Also threaded onto external threads 407 of the inner pole member outboard of cap 422 is a motor gain adjusting cap 430 which, as it is threaded, reduces or increases the air gap g.

The alternative permanent magnet structure just described can be received into the open end 16 of the housing 10 shown in FIG. 2, in particular outer pole member 418 fits into intermediate bore 16b and is held therein by a clamp collar similar to collar 20 described for FIGS. 1 and 2. The other servovalve components would be similar to those described hereinabove with respect to FIGS. 1–2 and 4.

Figure 3:
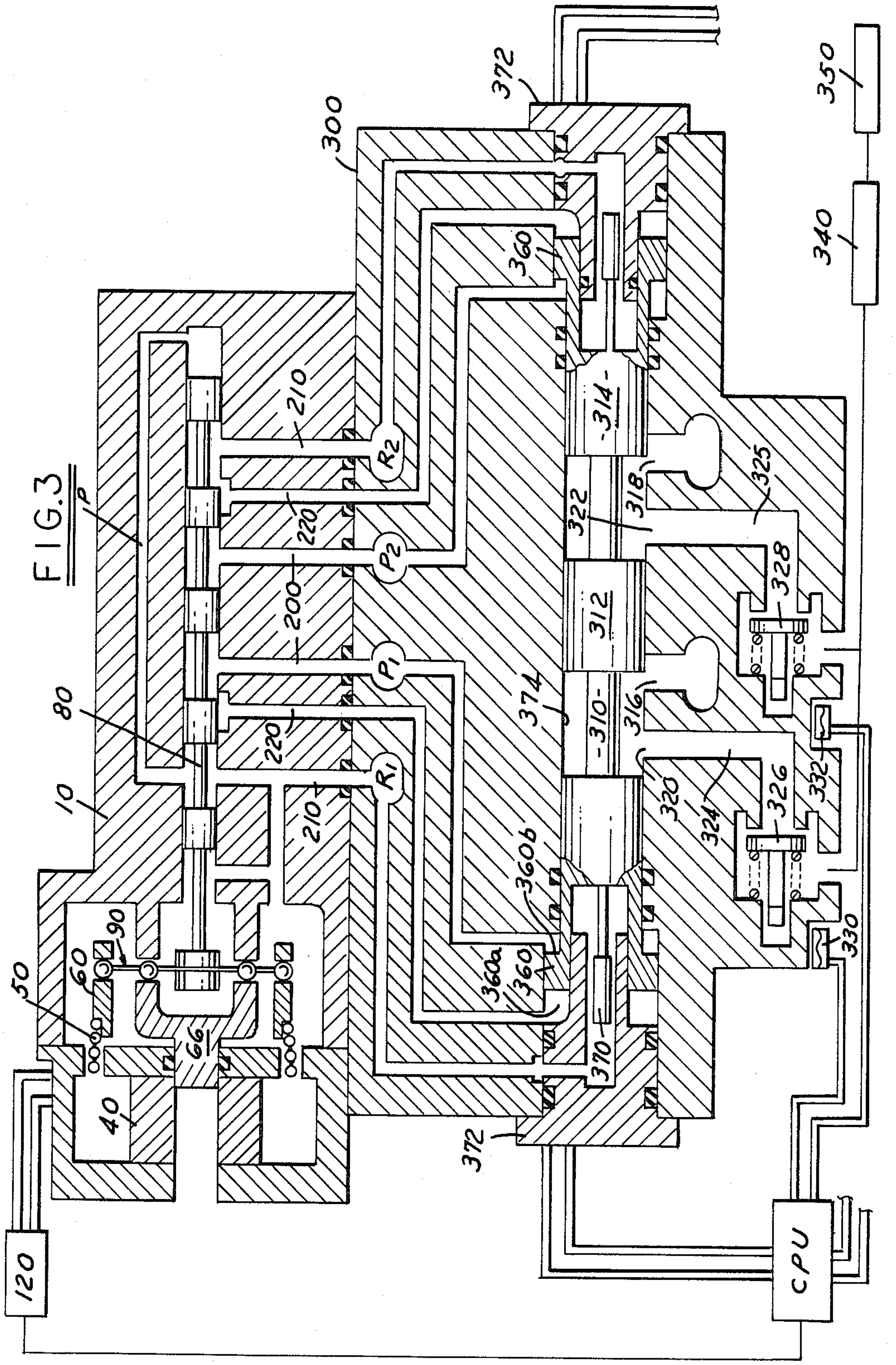
FIG. 3 is a schematic illustration of a fuel control system including the servovalve of the invention.

As shown in schematic form in FIGS. 2 and 3, the valve spool and sleeve assembly form two hydraulic circuits $D_1$ and $D_2$ each comprised of supply pressure line 200, return pressure line 210 and control pressure line 220. Typical value for supply pressure $P_1$ and $P_2$ is 3000 psi while typical return pressure is 100 psi. The lines 200, 210 and 220 extend through fuel metering valve housing 300 in which is disposed the metering valve spool 310. The dual tandem spool 310 includes lands 312 and 314 which adjustably open or close dual fuel inlet ports 316 and 318 in the housing to control fuel flow through outlet ports 320 and 322. Positioned in each fuel outlet passages 324 and 325 receiving fuel from ports 320, 322 is a fuel check valve 326 and 328 to prevent back flow of fuel. Fuel flow sensing switches 330 and 332 sense the velocity of fuel flowing past the check valves and inputs velocity signals $V_1$ and $V_2$ to a central processing unit CPU. Downstream of the check valves is a fuel distribution valve 340 which divides fuel flow equally among a plurality of fuel nozzles 350 connected thereto and adapted to discharge fuel in the form of a spray cone into the combustor (not shown) of a gas turbine engine (not shown).

The valve spool 310 includes at opposite ends an annular piston 360 having a relatively large area side 360a in fluid pressure communication with control pressure lines 220 and a smaller area side 360b in communication with supply pressure lines 200. Typically, the large area side 360a has a surface area twice that of the small area side 360b.

It is apparent that when the valve spool 80 of the direct drive servovalve connects the supply pressure line and the control pressure line, as shown for left-hand line 200 with source $P_1$ in FIG. 3, valve spool 310 will be moved to the right in FIG. 3 and open fuel ports 320, 322 to increase fuel flow. Of course, movement of the valve spool 80 of the direct drive servovalve in the right-hand direction of the Figure reverses the fluid flow connections just described and causes the valve spool 310 of the fuel metering valve to move to the left and reduce fuel flow.

Also at opposite ends of the valve spool 310 are cores 370 which cooperate with spool position sensing feedback transducers 372 inserted into the opposite ends of the bore 374 through the fuel metering valve. The transducers determine relative position of the valve spool 310 and send position signals $\phi_1$ and $\phi_2$ to the CPU.

The CPU, using signals $\phi_1$ and $\phi_2$, $V_1$ and $V_2$ and other signals representing engine parameters or pilot instructions, controls the direct drive servovalve through the electronic controller 120 and leads $L_1$ through $L_4$. Signals can be inputted representing engine speed, engine pressure, exhaust air composition and the like. And, of course, the pilot's throttle position signal would be input to the CPU.

While certain specific and preferred embodiments of the invention have been described in detail hereinabove, those skilled in the art will recognize that various modifications and changes can be made therein within the scope of the appended claims which are intended to include equivalents of such embodiments.

We claim:

1. A direct drive valve comprising:
(a) housing means,
(b) valve means movable disposed in the housing means,
(c) magnet means and coil means in the housing means with one of said magnet means and coil means having bore means and being movable relative to the other when said coil means is energized,
(d) means for movably supporting said one of said magnet means and coil means in said housing means,
(e) a portion of said valve means extending within the bore means of said one of said magnet means and coil means,
(f) pivot support means in the housing means extending within the bore means of said one of said magnet means and coil means between said one of said magnet means and coil means and said portion of said valve means therein,
(g) lever means having a first portion coupled to and actuated by said one of said magnet means and coil means, a second portion coupled to and actuating the valve means and an intermediate portion between said first portion and second portion pivotally supported on said pivot support means, and
(h) means for energizing the coil means to impart movement to said one of said magnet means and coil means which is transmitted to the valve means by the lever means.

2. A direct drive valve comprising:
(a) housing means,
(b) valve means slidably supported in the housing means,
(c) pivot support means in the housing means,
(d) a stationary magnet means and a moving coil means movable relative thereto when energized,
(e) spring means for movably supporting the coil means from the pivot support means,
(f) lever means having a first portion coupled to and actuated by the moving coil means, a second portion coupled to and actuating the valve means and an intermediate portion between said first portion and second portion pivotally supported on said pivot support means, and (g) means for energizing the moving coil means to impart movement thereto which is transmitted to the valve means by the lever means.

3. The valve of claim 1 or 2 wherein the lever means is configured to amplify the force transmitted to the valve means.

4. The valve of claim 2 wherein the moving coil means is supported by said spring means for substantially linear movement in a working gap of the stationary magnet means.

5. The valve of claim 1 wherein the valve means has a longitudinal axis and the relative movement between said magnet means and coil means is in a line of action substantially parallel to the longitudinal axis of the valve means.

6. The valve of claim 1 wherein the intermediate portion of the lever means is pivotably supported on the pivot support means which is substantially coaxially aligned with said valve means.

7. The valve of claim 6 wherein the coil means is movable relative to the magnet means and the moving coil means is supported by said spring means from the pivot support means.

8. The valve of claim 7 wherein the moving coil means s supported on said pivot support means by multiple spring diaphragm means.

9. The valve of claim 2 wherein the means for energizing the coil means is a pulse width modulated drive means.

10. The valve of claim 6 wherein the stationary magnet means comprises an outer annular pole member with an axial bore, an inner pole member disposed in said axial bore spaced from said outer pole member to form a working gap therebetween and a permanent magnet disposed adjacent said inner pole member in said axial bore, said inner pole member and permanent magnet each having a bore coaxial with and receiving the pivot support means.

11. The valve of claim 10 wherein a non-magnetic annular spacer member is positioned between said outer pole member and said inner pole member and permanent magnet, said spacer member being metallurgically attached to said outer pole member and inner pole member.

12. The valve of claim 2 wherein the stationary magnet means comprises an elongated inner member having one end forming an inner pole portion, another end forming a threaded portion and an intermediate portion between said ends, an annular outer pole surrounding and spaced from said one end of said inner member to define a working gap between said inner pole portion and outer pole member, permanent magnet means on said intermediate portion and means for holding the magnet means on the intermediate portion of the inner member.

13. The valve of claim 12 wherein said means for holding said magnet means comprises backing means disposed adjacent said magnet means on the exterior thereof and cammed against said magnet means toward said intermediate portion.

14. The valve of claim 13 wherein said backing means includes a conical cam surface in camming engagement with a complementary conical cam surface on said outer pole member and on a threadably adjustable retainer cap on the threaded portion of the inner member.

15. The valve of claim 1 wherein the movable one of said magent means and coil means includes oppositie and said pivot support means extends within one of said opposite ends and said portion of said valve means extends within the other of said opposite ends.

16. A direct drive servovalve comprising:

(a) housing means, (b) valve spool means slidably mounted in the housing means, (c) pivot support means disposed in the housing means, (d) a stationary magnet means disposed in said housing means defining a working gap and a moving coil means disposed in the working gap, (e) spring means for supporting the moving coil means in the working gap from said pivot support means, (f) multiple lever means each having an end portion connected to the moving coil means, another end portion operatively engaged with the valve spool means and an intermediate portion pivotally supported on the pivot support means, and (g) means for energizing the moving coil means to impart linear movement thereto which is amplified and transmitted to the valve spool means by said lever means.

17. The servovalve of claim 16 wherein the valve spool means has a longitudinal axis and the linear movement of the moving coil means is substantially parallel with the longitudinal axis of the valve spool means.

18. The servovalve of claim 17 wherein the pivot support means has a longitudinal axis and the longitudinal axis of the pivot support means is substantially coaxial with that of the valve spool means.

19. The servovalve of claim 18 wherein the stationary magnet means has a longitudinal axis and the longitudinal axis of the stationary magnet means is substantially coaxial with that of the valve spool means.

20. The servovalve of claim 18 wherein the moving coil means includes a coil support ring having a longitudinal axis substantially coaxial with that of the valve spool means.

21. The servovalve of claim 16 wherein the spring means comprises annular convoluted suspension spring diaphragms with an inner periphery and an outer periphery and with the inner periphery attached to the pivot support means and the outer periphery attached to the moving coil means.

22. The servovalve of claim 16 wherein the intermediate portion of each lever means includes a ball pivotally supported in the pivot support means.

23. The servovalve of claim 22 wherein said end portion of each lever means comprises an outer ball received in a passage in said moving coil means.

24. The servovalve of claim 23 wherein said another end of each lever means includes an inner ball received in a groove in the valve spool means.

25. The servovalve of claim 16 which further includes an externally accessible hydraulic null adjustment means for engaging the pivot support means and adjusting its position against the bias of axial spring means.

26. The servovalve of claim 16 which further includes an externally accessible motor gain adjustment means for shunting a reluctance member disposed in the flux path of the stationary magnet means.

27. The servovalve of claim 16 which further includes an externally accessible hydraulic null adjustment means with a threaded portion and said pivot support means includes a threaded portion threadably engaged therewith, said thread portions of said hydraulic null adjustment means and pivot support means being differentially threaded relative to one another for adjusting the position of the pivot support means by rotation of said hydraulic null adjustment means.

28. A direct drive valve comprising:
(a) a housing means having a first chamber and second chamber,
(b) a pivot hub means disposed in the housing means,
(c) a tandem valve spool means and sleeve means disposed in said first chamber and providing multiple independent hydraulic circuits, said spool means being in close sliding fit in said sleeve means,
(d) stationary magnet means in said second chamber defining a working gap and moving coil means disposed in the working gap,
(e) annular coil support means supporting the moving coil means and disposed around the pivot hub means,
(f) multiple spring diaphragm means suspending the coil support means from the pivot hub means to allow linear movement of the moving coil means in the working gap,
(g) multiple lever means each having an outer end ball operatively engaged with the coil support ring means, an inner end ball operatively engaged with the valve spool means and an intermediate ball pivotally supported on the pivot hub means, and
(g) drive means for energizing the moving coil means to impart linear movement thereto which is amplified and transmitted to the valve spool means by said multiple lever means.

29. The servovalve of claim 28 wherein the distance between the outer ball and intermediate ball of each lever means is greater than the distance between the inner ball and intermediate ball.

30. The servovalve of claim 29 wherein the intermediate ball of each lever means is pivotally supported in a sleeve in the pivot hub means.

31. The servovalve of claim 30 wherein the sleeve functions as an antifriction bearing.

32. The servovalve of claim 29 wherein the pivot hub means is coaxially disposed relative to the valve spool means and includes a counterbore receiving an end of the valve spool means for engagement with the inner ball means.

33. The servovalve of claim 32 wherein the stationary magnet means is disposed around and coaxial with the pivot hub means.

34. The servovalve of claim 29 which further includes an externally accessible hydraulic null adjustment means extending through a portion of the stationary magnet means for engaging the pivot hub means and positioning it axially against the axial bias of spring means.

35. The servovalve of claim 29 which further includes an externally accessible motor gain adjustment means for shunting a reluctance means in the flux path of the stationary magnet means.

36. The servovalve of claim 29 where the valve spool means includes opposite ends and the opposite ends of the valve spool means are subject to the same hydraulic return pressure.

37. The servovalve of claim 36 wherein the valve sleeve includes symmetrical sleeve fluid return and fluid supply holes and metering orifices.

38. A control system useful for a gas turbine engine including the valve of claim 1.

39. A fuel control system useful for a gas turbine engine including the servovalve of claim 16.

40. A fuel control system useful for a gas turbine engine including the servovalve of claim 28.

41. A force motor comprising:
(a) a stationary magnet means and a moving coil means movable relative thereto when energized,
(b) means for slidably supporting the moving coil means,
(c) pivot support means extending within the coil means,
(d) lever means having a first portion coupled to and actuated by the moving coil means, a second portion for exerting a motive force and an intermediate portion between said first portion and second portion pivotally supported on said pivot support means, and
(e) means for energizing the moving coil means to impart movement thereto which is transmitted as a motive force by the lever means.

42. A force motor comprising:
(a) housing means,
(b) pivot support means in the housing means,
(c) a stationary magnet means disposed in said housing means defining a working gap and a moving coil means disposed in the working gap,
(d) spring means for supporting the moving coil means in the working gap from said pivot support means,
(e) lever means having an end portion coupled to the moving coil means, another end portion for exerting a motive force, and an intermediate portion pivotally supported on the pivot support means, and
(f) means for energizing the moving coil means to impart linear movement thereto which is amplified and transmitted as a motive force by the lever means.

* * * * *